(No Model.) 6 Sheets—Sheet 1.

E. P. COWLES.
COMPOUND STEAM ENGINE.

No. 465,241. Patented Dec. 15, 1891.

Witnesses:
F. M. Burnham.
J. P. Davis.

Inventor:
Edward P. Cowles,
By Chas. B. Mann
Atty.

(No Model.) 6 Sheets—Sheet 3.

E. P. COWLES.
COMPOUND STEAM ENGINE.

No. 465,241. Patented Dec. 15, 1891.

Fig. 2ª

WITNESSES:
Otto H. Ehlers.
J. P. Davis.

INVENTOR:
Edward P. Cowles.
BY Chas B. Mann
ATTORNEY.

(No Model.) 6 Sheets—Sheet 4.

E. P. COWLES.
COMPOUND STEAM ENGINE.

No. 465,241. Patented Dec. 15, 1891.

Witnesses:
A. M. Burnham.
F. P. Davis.

Inventor:
Edward P. Cowles,
By Chas. B. Mann
Atty.

(No Model.)  E. P. COWLES.  6 Sheets—Sheet 5.
COMPOUND STEAM ENGINE.

No. 465,241.  Patented Dec. 15, 1891.

Witnesses
J. M. Fader Jr.
J. P. Davis

Inventor
Edward P. Cowles,
By Chas. B. Mann
Atty.

(No Model.) 6 Sheets—Sheet 6.

E. P. COWLES.
COMPOUND STEAM ENGINE.

No. 465,241. Patented Dec. 15, 1891.

WITNESSES:
Otto H. Ehlers.
J. P. Davis.

INVENTOR:
Edward P. Cowles,
BY Chas B. Mann
ATTORNEY.

UNITED STATES PATENT OFFICE.

EDWARD P. COWLES, OF NEW DECATUR, ALABAMA.

COMPOUND STEAM-ENGINE.

SPECIFICATION forming part of Letters Patent No. 465,241, dated December 15, 1891.

Application filed January 7, 1891. Serial No. 376,940. (No model.)

*To all whom it may concern:*

Be it known that I, EDWARD P. COWLES, a citizen of the United States, residing at New Decatur, in the county of Morgan and State of Alabama, have invented certain new and useful Improvements in Compound Steam-Engines, of which the following is a specification.

This invention has relation to compound steam-engines; and it consists in certain peculiarities in the construction, arrangement, and combination of parts, as will be hereinafter described, and particularly pointed out in the subjoined claims.

The object of my invention is to construct a compact and durable engine of the class stated in which the consumption of steam is economized.

In the accompanying drawings, illustrating the invention, Fig. 2ª is a similar section through the forward part of the engine, showing the interior parts on a larger scale than Fig. 2.

The same figures of reference are used in the several views to designate the same or corresponding parts.

1 designates a high-pressure cylinder, which consists of two concentric shells joined together by webs 3, forming a plain cylinder having longitudinal passages 4 through it, which passages communicate with the steam-chests 5, which are located at either end of the said cylinder, whereby steam will be permitted to freely enter between said shells and the cylinder thereby kept at a high-pressure temperature at all times, as will be hereinafter explained, and they also serve as passages for valve-rods 43, as hereinafter set forth. This high-pressure cylinder is located concentrically within a low-pressure cylinder 11, which is of the usual form, and the ends of said high and low pressure cylinders are secured to heads 7 in the usual manner.

For convenience in describing my invention and for the sake of perspicuity I will herein designate that end of the engine nearest which the cylinders are located as the "forward" end thereof and the opposite end of the engine as the "rear" end. It therefore follows that where the parts are duplicate they will respectively be termed the "rear" or "forward" part, according to their location with respect to the ends of the engine.

12 designates an annular piston-head, which operates within the low-pressure cylinder 11. The inner surface of this piston-head is formed to closely fit the circumference of the high-pressure cylinder, while its circumference is formed to fit the inner surface of the low-pressure cylinder, all of which is clearly shown in Fig. 2. This piston-head 12 is provided with parallel rods 13, which are located on either side of the high-pressure cylinder, and reciprocating within said high-pressure cylinder is a piston 14, having a rod 15, which is connected with a crank 16, mounted on a shaft 17, which shaft is located near the rear end of the engine and extends transversely thereof. Also mounted on this shaft and having connection with the piston-rods 13 are cranks 18, which are similar in every respect to the crank 16, except they are weighted, as will be hereinafter described, and extend in an opposite direction from said crank 16. It will be observed that the two reciprocating forces above described act on the same line, whereby all tendency to a twisting or lateral vibration of the engine in operation is removed. Moreover, these driving forces act against each other on opposite sides of the crank-shaft and thus prevent longitudinal vibration of the engine, and in order to still further prevent this I have formed the piston-head 14 and its connections somewhat heavier than the work requires and provided the cranks 18 with weights 19, which are secured to the same on the same side of the crank-shaft 17 as the crank 16. It is obvious that by properly proportioning the several parts the weight of one set of pistons and cranks can be made to counterbalance that of the other. The engine will thus operate without any of the annoying and dangerous jarring incident to those heretofore constructed, the advantages of which will be readily understood and appreciated by those persons skilled in the art.

Figure 9:
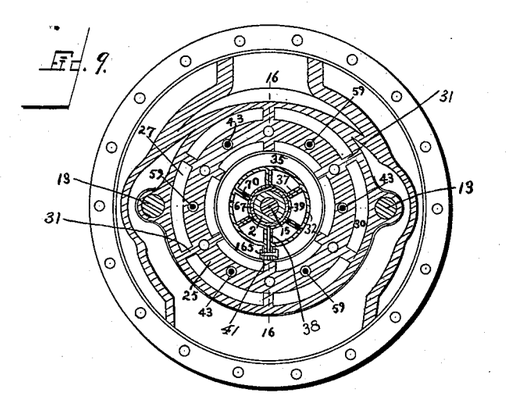
Fig. 9 is a similar section taken on the line 9 9 of Fig. 2 and shows the arrangement of the steam-ports.
Figure 10:
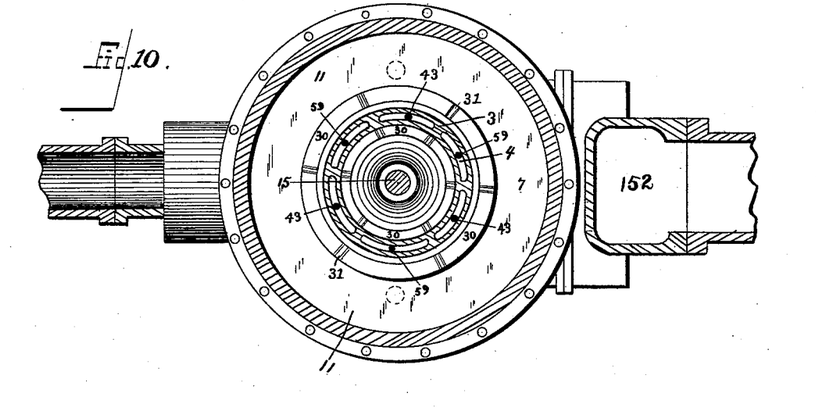
Fig. 10 is a vertical section on the line 10 10 of Fig. 2 and shows the construction and relative location of the cylinders.
Figure 11:
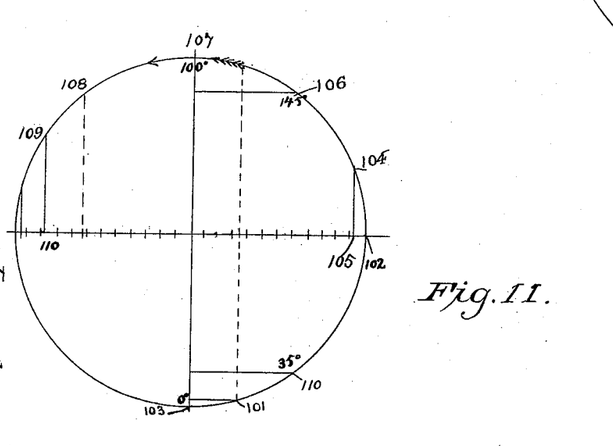
Fig. 11 is a diagram representing the relative movements of the piston and valves in double-expansion engines.

Each of the cylinder-heads 7 is formed with an extension 20. The extension of the forward head is bored to form an inwardly-extending annular flange 21, which will aid in its being secured to the lid 22 of the forward steam-chest, and the extension opposite thereto is formed with a flange 23, which serves as a means whereby it can be secured to the bed-plate 24 of the engine. Projecting from the cylinder-heads 7 into each of these steam-chests is an annular block or ring 25, which is concentric with said extension 20. The block 25, located in the forward chest, is cored out to form steam-passages 26 and 29, which communicate, respectively, with the high and low pressure cylinders, and the block located in the rear chest is also cored out to form steam-passages, (designated by the figures 28 and 27,) which likewise respectively communicate with the interiors of the high and low pressure cylinders. The cylinder-heads are formed with ports or openings 30, coinciding with said passages, whereby said communication is had. Located at suitable distances apart within these passages in the cylinder-heads are webs 31, (see Figs. 9 and 10,) which serve to connect together the adjacent surfaces of the parts of the heads formed by said openings.

Figure 12:
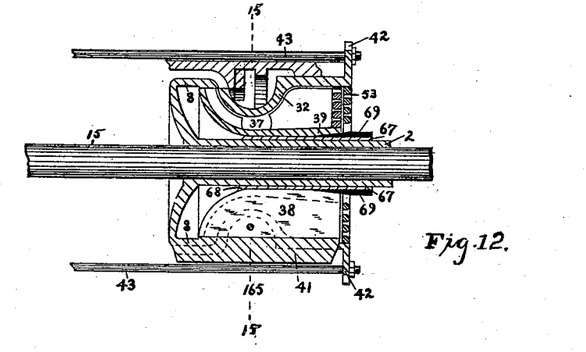
Fig. 12 is a longitudinal vertical section of the slide-valve, taken on the line 12 12 of Fig. 9.
Figure 13:
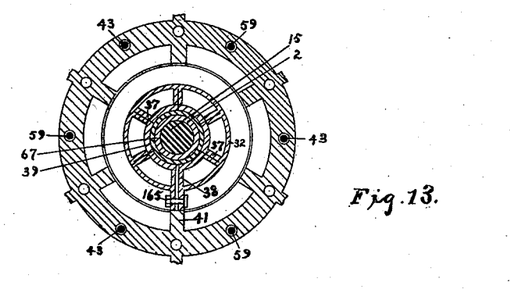
Fig. 13 is a cross-section on the line 13 13 of Fig. 12, looking toward the cylinder end of the valve.
Figure 14:
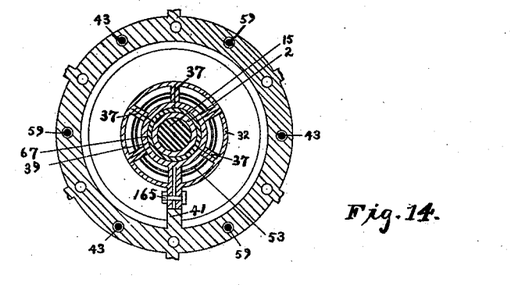
Fig. 14 is a section on the same line, looking toward the cut-off end.

Each of the annular blocks is bored out concentric with the cylinders and pistons, and within them operate piston slide-valves 32, (one for each chest,) which serve to open and close the ports leading into and from the cylinders. Each of these valves consists of a shell formed with an exhaust-cavity 35, which is located near the center of the valve-chest. Wings 37 and 38 project from and are preferably formed integral with each of the valves, and they serve to connect the same with a sleeve or hub 39, which guides and supports said valve and moves therewith. The wings 38 are double and extend into and through the exhaust-cavity of their respective valves, the latter being divided at this point, at which division the passages for steam are bridged by projections 41, extending across said passages to the extremity of the wings 38, as clearly shown in Figs. 12, 13, and 14. A metal surface the entire length of the valve is thus provided, above which the cut forming the division is located, and leakage is thereby prevented.

Each of the slide-valves is formed with an outwardly-extending flange 42, and extending through the passages 4 between the shells of the high-pressure cylinder are shouldered rods 43, which connect said flanges, and consequently the valves themselves, together, thus forming practically one valve operated by the same gear, (which gear will be hereinafter described,) and they also pass through the annular blocks 25. The openings through the said blocks and between the shells of the high-pressure cylinder are of a greater diameter than that of said rods, so that they will afford free passage for the live steam between the shells of the said cylinder, thus keeping said cylinder at a high temperature at all times when the engine is in operation and preventing condensation of steam incident to its entrance into the cylinder when the walls of the latter are of a temperature lower than that of the steam.

The steam edges of the slide-valves 32, adjoining the cylinder, are chambered over by means of disks 80, which are cast integral with the hubs 39 and wings 37. The design in so constructing the valves is to prevent the entrance of steam into the valve at this end of the latter.

Figure 1:
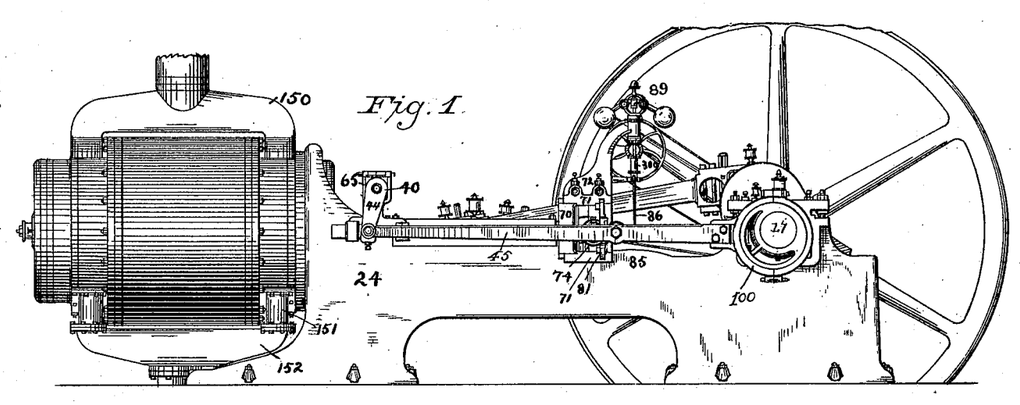
Figure 1 is a side elevation of a compound steam-engine constructed after the plan to be hereinafter set forth.
Figure 2:
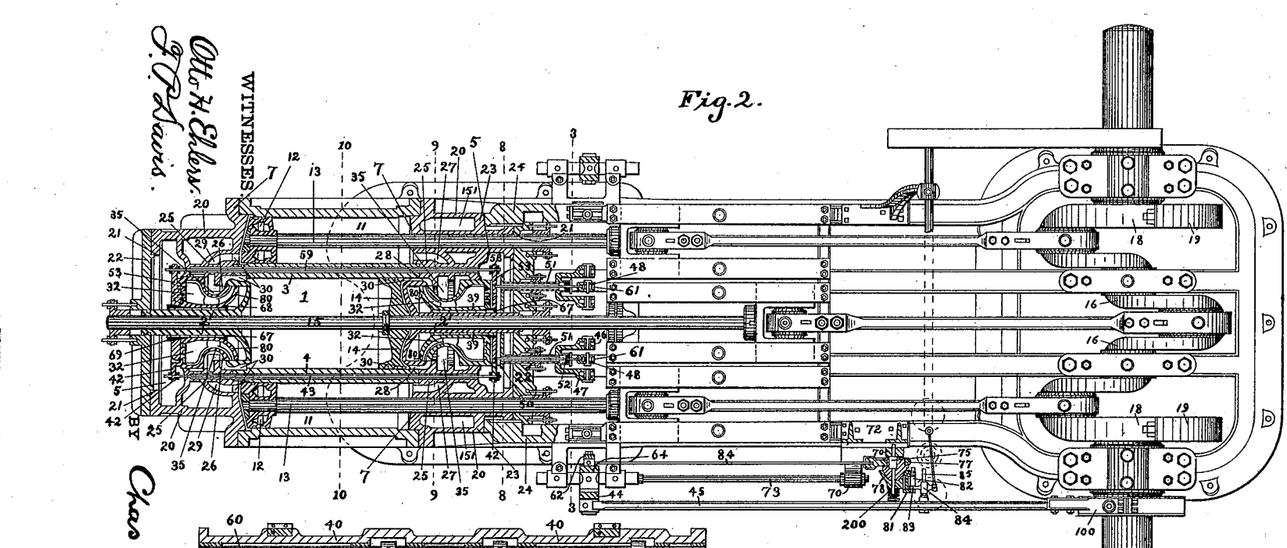
Fig. 2 is a horizontal section of the same and shows the relative location of the several interior parts thereof.
Figure 2A:
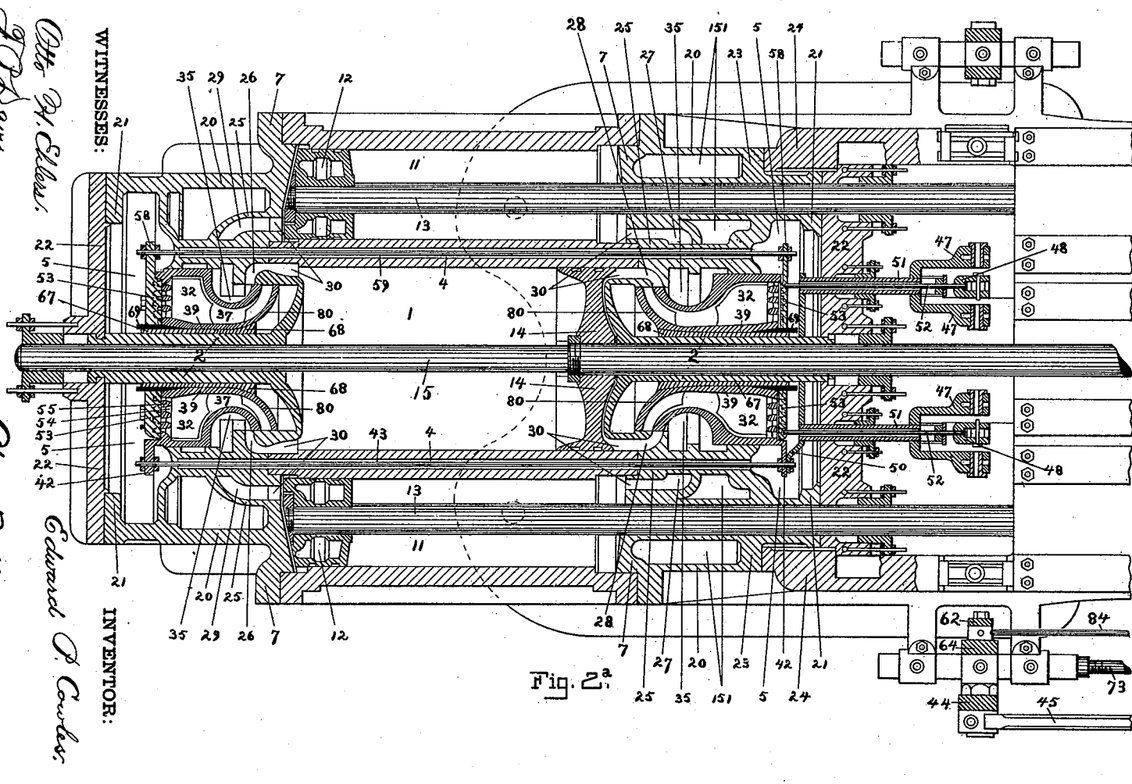

Bolted to the flange of the rear valve is a rearwardly-extending yoke or saddle 50, (see Fig. 6,) to which are secured rearwardly-extending hollow stems 51, which are located on opposite sides of the piston-rod 15 and are formed with forked ends, which have grooves in their extremities, as shown at 47. (See Fig. 2.) Through these stems pass rods 52, which are attached to and work a cut-off valve 53, which, together with the openings or ports it closes, are shown in detail in Fig. 6. These rods are also provided with bifurcated ends 48, the purpose of which will be hereinafter stated. At the rear end of the rear valve 32 is, as shown in Fig. 2, a wall perpendicular to the line of travel of the said valve, and within this wall are formed the annular openings 54, which admit steam to the inside of the valve and leave bars 55. The cut-off valve is of the same form as this wall, and its bars correspond with and serve to close the openings or steam-ports between the bars of the said wall. At the forward end of the forward valve is a similar wall and cut-off valve, and the two cut-off valves are connected together by means of shouldered rods 59, which are secured to radial arms 58, connecting together the bars of the cut-off valves and extending beyond the slide-valves to permit their connection with the rods 59, thus forming, practically, one valve. These rods 59 are similar to the rods 43, connecting the slide-valves, and they extend between the shells of the high-pressure cylinder, as clearly shown in Fig. 2. They are of sufficient length to allow play between the cut-off valves and the open walls of the slide-valves. It is obvious that these cut-off valves operate alternately to open and close the ports, or, in other words, that when the cut-off ports at one end of the engine are open those toward the other end thereof are closed.

Each of the slide-valves is capable of expansion to counteract the effect which wear incident to its use would otherwise have on it by the following-described means: The bore of the hub 39 of each valve is formed conical at each end, as shown in Fig. 2. Passing through and beyond this hub is a sleeve 67, which is made flaring at one end and provided with a coned nut at its opposite end, (shown, respectively, at 68 and 69.) Upon turning the nut upon the sleeve it will be seen that the flared end of the latter and the said nut will be drawn toward each other and into said hub 39, thereby expanding the valve equally in every direction, said valve being split or divided lengthwise by wings 38, as before described. To facilitate such expansion the wings 37 of the valves are split for a portion of their length, as shown at 70, Fig. 9. The valves 32 are supposed to be, and usually are, stiff enough to successfully resist the tendency of steam-pressure to expand them; but in order to render positive the failure of the steam to have such an effect on them a bolt 165 is provided, which connects the walls of the wing 38 and prevents them from being spread apart, and also serves to draw the members of said wings together and bind the valve on its sleeve 67. The cut-off valves 53 fit around the nuts 69 and slide thereon. The piston-rod 15 of the piston of the high-pressure cylinder passes through sleeves 2, located one at each end of the high-pressure cylinder, which sleeves serve as bearings for said piston-rod, sustaining the same and relieving the cylinders and their heads of much of the wear to which they would ordinarily be subjected. These sleeves extend from the ends of the cylinder to the lids 22 thereof, and their outer surfaces are turned off concentric with the valve-seats in the annular blocks. On them slide the sleeves 67 and hubs 39 of the valves 32. Each of the valve-seats is counterbored, as shown at 8, Fig. 2, and the disk 80 of said valve overrides said counterbore immediately after the closure of the ports in the heads of the high-pressure cylinder, thus admitting steam to the interior of said valve, which steam will serve to balance the cut-off valve, so that its return movement is unobstructed. Steam gains access to the space between the disk 80 and the cylinder-head for this purpose through the space between the divided wings 38.

Figure 3:
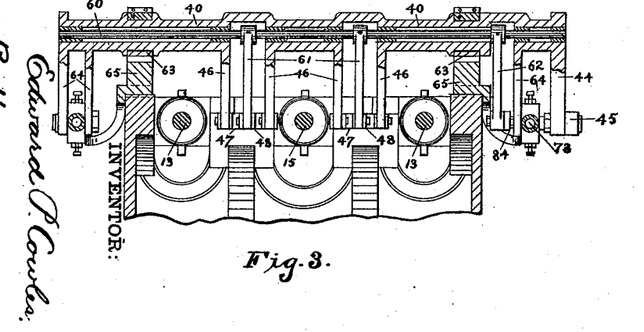
Fig. 3 is a transverse vertical section taken on the line 3 3, Fig. 2.

The slide and cut-off valves are operated by the following-described mechanism: 40 designates a rock-shaft, which is operated by means of the arm 44 and eccentric-rod 45, located outside of the bed-plate, as is usual. The rock-shaft is provided with depending arms 46, which are located in pairs on opposite sides of the piston-rod 15, as shown in Fig. 3. The lower ends of these arms are pivoted to the forked ends 47 of the hollow stems 51. The rock-shaft is cast hollow, and through it passes a shaft 60, which is provided with depending arms 61, located between the arms 46 of the rock-shaft and pivoted at their lower ends to the rear extremities of the rods 52, which rods are, as hereinbefore stated, formed or provided with bifurcated rear extremities 48 for the reception of the ends of said arms. The shaft 60 is also provided with an arm 62, which extends parallel with the arm 44 of the rock-shaft, and like said arm is located beyond the outer surface of the bed-plate of the engine. From the foregoing it will be readily understood that any movement of the arm 62 with respect to the arm 44 will move the cut-off valve 53 with respect to the slide-valve 32 within the rear steam-chest, and that when said rods move together or in unison no such movement of the cut-off valve will result.

In view of the fact that with the before-described construction there is no room for the usual connections between the stems 51 and rods 52 and the arms 46 and 61 and that it is necessary to accommodate the arc described by said arms in operation, the rock-shaft is supported in vertically-adjustable bearings 63 by arms 64, the said bearings sliding in brackets 65 on the engine-frame.

Figure 4:
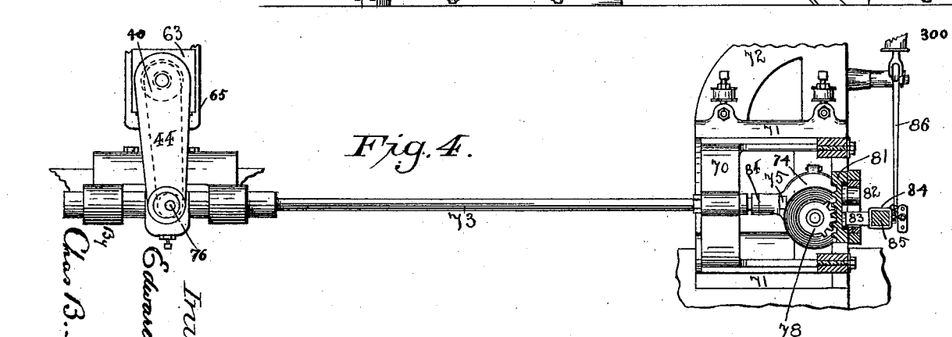
Fig. 4 is an enlarged side view, partly in section, of the automatic attachment for governing the cut-off valves.
Figure 5:
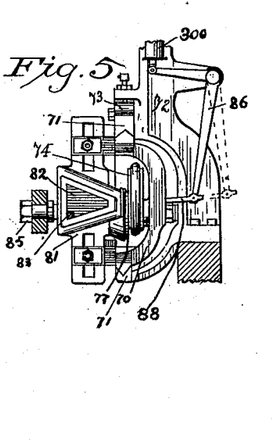
Fig. 5 is an end view of the same.

The mechanism for operating the cut-off valves is supported by a block or frame 70, (see Figs. 4 and 5,) which is movable in guides 71, formed on a bracket 72, attached to the engine-frame. This block is connected to the arm 44 of the rock-shaft by means of a rod 73, so that in operation it has the same horizontal movement as the eccentric-rod 45.

74 designates an eccentric crank or cam, which is provided with a pin 75, forming its axle. This pin has its bearings in the block or frame 70, and it extends outward therefrom toward the eccentric-rod 45. Any movement of the eccentric crank or cam 74 will be transmitted to the cut-off valves by a rod 84, connecting said eccentric and the arm 62, moving said valves with respect to the slide-valves 32, and opening or closing, as the case may be, the ports in the walls of said slide-valves, as the horizontal motion of the pin 75 coincides with that of the pivot-pin 76 of the arm 44; but when said eccentric is stationary it will firmly resist any motion of said cut-off valve with respect to the slide-valve. This eccentric crank or cam is formed or provided with a hub 77, which in shape is like a frustum of a cone, and located outside of this hub and centered on the pin 75 thereof is a pinion or segment of a pinion 78, the inner surface of which is cupped to fit said cone-shaped hub. A spring 200, Fig. 2, is located outside the pinion 78, which spring when compressed by a nut on the end of the pivot-pin 75 will force the cones together and both against the block or frame 70. The friction between the cones is greater than that between the eccentric-cam and the block or frame, and thus when the pinion 78 turns it will carry the eccentric-cam, and also the cut-off valve with it until said cut-off valve is seated, when further movement of said eccentric-cam ceases and the cones slip the rest of the movement of the pinion or segment of pinion. It will therefore be seen that the initial movement of the pinion in either direction opens or closes the cut-off and that the balance of its movement is consumed by the slip-joint formed by the hub of the eccentric-crank and the cup of the pinion.

Intermeshing with the teeth of the segment of pinion 78 is a rack 81, which slides vertically in guides formed on the block or frame 70. This rack carries an isosceles triangle 82 on the side opposite said pinion, the perpendicular bisecting-line of which is at right angles to the line of travel of said rack 81. More or less of the transverse motion of the eccentric-rod 45 is transmitted to this rack by means of a pin 83, provided with a hub 84, sliding on a square or feathered pin 85, projecting inwardly from said eccentric-rod, the degree of motion depending on the position of the pin 83 with respect to the apex and base of the triangle 82, as is obvious.

It will be readily understood that the before-described mechanism for operating the cut-off valves is automatic in its action and that by utilizing the transverse motion of the eccentric-rod no extra parts are or need be introduced, as the movement of said eccentric-rod approximates closely to that of the high-pressure piston, the transverse motion of said eccentric-rod being peculiarly adapted to the use to which it is put from the fact that it is the lap of the valve in advance of the said piston.

A movement of five thirty-seconds of an inch of the cut-off valve gives a large clear opening.

Figure 6:
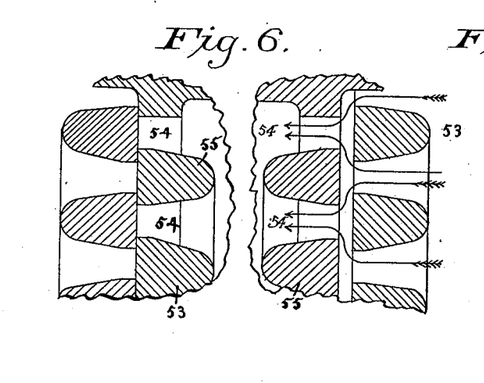
Fig. 6 is an enlarged detail sectional view illustrating the construction of the cut-off valves and ports.
Figure 7:
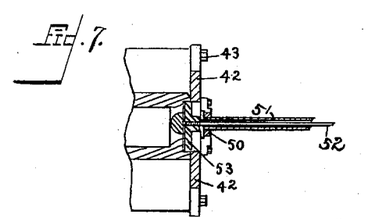
Fig. 7 is a vertical longitudinal section on the line 7 7 of Fig. 8.
Figure 8:
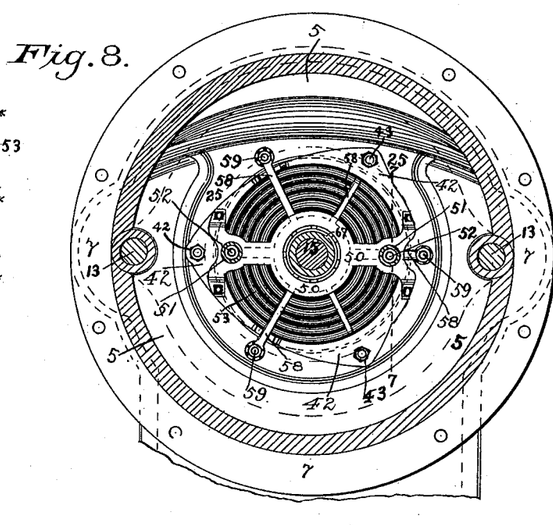
Fig. 8 is a vertical section on the line 8 8 of Fig. 2.

As the ports of the cut-off mechanism take steam from both sides, as shown by the arrows in Fig. 6, the valve is required to travel only one-half the width of the port to open or close the same. In the present instance the cut-off port is practically twenty-six feet long, and a movement of five thirty-seconds of an inch gives forty-eight square inches of opening. The throw of the eccentric 74 is two inches and the diameter of the pitch-circle of the segment of pinion 78 is three inches, so that, obviously, a movement of one-fourth of an inch in the rack 81 closes the cut-off valve. The pin 85 is located at such a point in the eccentric-rod 45 as will give a positive motion and at the same time will not render the connections 73 and 84 too cumbersome. In the present case the main eccentric 100 has a throw of three and one-half inches, and the pin 85 is placed where it will have a vertical movement of two and one-half inches. Hence the pin 83 has the same vertical movement, and it therefore takes an angular advance of thirty-five degrees of the main eccentric to close the cut-off valve. The triangle 82, hereinbefore described, has a width at its base sufficient to allow the pin 83 to have a play equal to its vertical travel less the movement necessary to close the cut-off valve, which in this case is two and one-fourth inches. At the apex of this triangle said pin fits closely the sides of the latter.

The operation of this cut-off will be fully understood from the foregoing, taken in connection with the eccentric diagram, Fig. 15. This diagram is laid off with the eccentric-circle full size, having a diameter of three and one-half inches, which also represents the piston stroke, which is twenty-four inches, the division-marks indicating inches of the piston stroke. The crank is represented as traveling in the same circle as the eccentric-center. The piston-valve 32 has a lap of seven-sixteenths of an inch and a lead of one-sixteenth of an inch, giving a linear advance of one-half of an inch, thus placing the eccentric-center at the point marked 101 when the crank is on a dead-center at 102. Suppose the pin 83 to be at the apex of the triangle 82. The cut-off would commence to close when eccentric was at 103, its lower mid-position, or before the piston reached the end of its stroke. It would close when the eccentric-center had traveled up thirty-five degrees from said mid-position, or to the point marked 110, at which time the crank would be at 104 and the piston at 105. Steam would thus have followed the piston only three-fourths of an inch. Supposing the pin to be at the base of the triangle 82, the cut-off would remain open until said pin had traveled across to the opposite side of the triangle, or until the eccentric-center had reached the point marked 106, thirty-five degrees below 107, which designates the upper mid-position of the eccentric-center, and the said cut-off would be closed as the eccentric-center traveled from the point 106 to 107, while the crank is traveling from the point marked 108 to 109. Valve 32 cuts off when the crank is at 109 and the piston at 110. Thus steam would now have followed the piston twenty-two inches. It is obvious that by moving pin 83 from one end of the triangle to the other the cut-off can be made to take place at any point between three-fourths of an inch and twenty-two inches. It is further obvious than in no case does the piston travel more than two and one-half inches during the cut-off movement, which is practically instantaneous.

The slide-pin 83 is connected to an angle-lever 86, which is pivoted to the bracket 72 by means of a rod 88, having ball-joints. The short horizontal member of this angle-lever is connected to a governor 89, which may be of the ordinary and well-known construction, and which is situated upon the bracket 72.

When this pin 83 is disengaged from the sides of the triangle 82, the slightest force exerted upon it will be sufficient to cause it to slide on the pin 85, thus rendering it extremely sensitive and capable of responding to the slightest change of speed. When the pin 83 engages the sides of the triangle 82, it binds on this feathered pin 85, and further movement of the pin 83 will be prevented thereby.

The eccentric crank or cam is made sufficiently large and there is sufficient friction between it and the box or frame 70 of the automatic cut-off gear to prevent any movement of it by the force applied to 84.

As before stated, the rod 88 has a ball-and-socket connection with the angle-lever 86 and sliding pin 83, which serves to accommodate the circular motion of this rod 88 toward the eccentric-rod 45. As said rod 88 describes an arc, it causes a slight oscillation of the angle-lever 86, which oscillation would disturb the action of the governors. To overcome this disadvantage and to permit the governor to operate while the pin 83 is engaged, a double-acting spring 300 is provided, which spring is located between said governor and the short horizontal member of the angle-lever 86.

It will be observed that the action of the slide-valve as to lead, compression, port-opening, &c., is not changed by the variation of cut-off.

The operation of the improved compound steam-engine hereinbefore described will be readily understood from the foregoing description, taken in connection with the accompanying drawings, and might be stated, briefly, as follows: Steam entering the steam-chest 5 through the branching pipe 150, which is located over the cylinders, passes thence through the steam-passage in the valve 32 and port 30 into the high-pressure cylinder. After driving the piston 14 to the front end of the cylinder it returns, through the passage 30 in the chest, into and through the exhaust-cavity 35 in the slide-valve 32, which has now shifted so that it occupies the position shown at the front end of the cylinder 28, Fig. 2. The steam thence passes through the passage 27 into the low-pressure cylinder. As the pistons move in opposite directions the low-pressure piston 12 will now be at the rear end of its cylinder. During the return of the high-pressure piston steam acts expansively to drive the low-pressure piston 12 to the front end of its cylinder, when the low-pressure cylinder exhausts into the exhaust-cavity of the slide-valve 32 at the rear end of the cylinder, said valve having now moved back into nearly its first position, (shown at 32 in Fig. 2,) and the steam thence passes into the exhaust-chamber 151, from which it escapes through the branching pipe 152, which is situated beneath the cylinders. The action is the same in the front chest.

It has been found from practical experience that in engines with piston-valves as heretofore constructed (in which the steam ports and passages were located at the sides of the cylinder instead of at the ends thereof, as in the present invention) a large portion of the steam having to pass entirely around the valve and through a long passage to reach the piston-head and then striking but one side of the latter renders useless when it is most needed a large portion of said ports. Obviously the above-described construction is not subject to this disadvantage, since the ports are of the same length at every point, thus admitting steam entirely around the piston-heads at the same instant, making every part of the port-opening of equal efficiency, and, moreover, because the steam-passages are short and direct, so that there will be very little loss. During the movement of the cut-off valve 53 it is exposed to full steam-pressure on each of its sides, and it will therefore be perfectly balanced. The combined area of the cut-off ports being greater than that of the steam-ports 30, the current of steam through said cut-off ports during admission is very slight, and what there is acts in the direction in which they are to move. When the cut-off valve closes, expansion begins both in the slide-valve in the rear steam-chest and in the high-pressure cylinder, so that the pressure outside is greater than on the inside, and the cut-off valve will be held firmly to its seat until said slide-valve closes the ports leading to the high-pressure cylinder, at which time steam will enter the counterbore in the annular block and release said cut-off valve. The power required to operate said cut-off valve is therefore very slight and its action is certain.

I do not wish to be understood as limiting myself to the precise construction herein set forth, as many modifications thereof will suggest themselves to persons skilled in the art.

It will be readily understood that the annular steam-ports in the steam-chests could be made in straight sections in the form of a polygon or in four long sections in the form of a square, or even two long ports, instead of circular, as shown; but this construction also is objectionable, inasmuch as the result attained thereby is not so perfect as by that shown. It will be observed that with this system of working steam direct there is no decrease of pressure except in driving the pistons forward, and there is thus no letting down of the pressure without performing a useful work.

Having thus described my invention, what I claim as new, and desire to secure by Letters Patent, is—

1. In a compound steam-engine, the combination of a low-pressure cylinder, a high-pressure cylinder located concentrically therein, pistons and piston-rods operating within said cylinders, steam-chests at the ends of the cylinders, piston slide-valves in said steam-chests concentric with the cylinders and pistons and governing passages leading to said cylinders, respectively, and mechanism for operating said valves.

2. In a compound steam-engine, the combination of a low-pressure cylinder, a high-pressure cylinder located concentrically therein, pistons and piston-rods operating within said cylinders, steam-chests at the ends of the cylinders, annular blocks or rings in said steam-chests having annular steam-passages communicating with the said cylinders, respectively, piston slide-valves operating within said annular blocks and governing said steam-passages, means for connecting said valves, and mechanism for operating them.

3. In a compound steam-engine, the combination of a low-pressure cylinder, a high-pressure cylinder located concentrically therein and consisting of a pair of concentric shells having a passage-way between them, pistons and piston-rods operating within said cylinders, steam-chests at the ends of the cylinders, communicating with the passage-way between the shells of the high-pressure cylinder, slide-valves in said steam-chests, rods connecting said valves and extending through the said passage-way, and mechanism for operating the valves.

4. In a steam-engine, the combination of a cylinder, a piston and piston-rod operating therein, steam-chests at the opposite ends of said cylinder, annular blocks or rings within said steam-chests having steam-passages communicating with the cylinder, slide-valves operating within said annular blocks and each consisting of a divided shell connected by split wings to a hub concentric with the piston-rod, means for connecting the valves, and mechanism for operating them.

5. In a steam-engine, the combination of a cylinder, a piston and piston-rod operating therein, steam-chests at the opposite ends of said cylinder, annular blocks or rings within said steam-chests having steam-passages communicating with the cylinder, slide-valves operating within said annular blocks and each consisting of a divided shell having an exhaust-cavity and connected by split wings to a hub concentric with the piston-rod, the division of said shell being formed by a double wing extending across the said exhaust-cavity and the steam edges of said valves being chambered over, means for connecting them, and mechanism for operating them.

6. In a steam-engine, the combination of a cylinder, a piston and piston-rod operating therein, steam-chests at the opposite ends of said cylinder, slide-valves operating in said steam-chests and each having a wall perpendicular to its line of travel and consisting of a series of concentric bars having openings between them and suitably connected together, cut-off valves of similar construction to said walls and adapted to close the openings in the latter, means for connecting said slide-valves, means for connecting said cut-off valves independent of said slide-valves, and meachanism for operating the slide and cut-off valves.

7. In a compound steam-engine, the combination of a low-pressure cylinder, a high-pressure cylinder located concentrically therein and consisting of a pair of concentric shells having a passage-way between them, pistons and piston-rods operating within said cylinders, steam-chests at the ends of the cylinders, communicating with the passage-way between the shells of the high-pressure cylinder, slide-valves in said steam-chests provided with end walls having openings or ports, cut-off valves for closing said ports, rods connecting said slide-valves and extending through the said passage-way, independent rods connecting said cut-off valves and also extending through the passage-way between the shells of the high-pressure cylinder, and mechanism for operating the slide and cut-off valves.

8. In a steam-engine, the combination of a cylinder, a piston and piston-rod operating therein, steam-chests at the opposite ends of the cylinder and communicating therewith, slide-valves operating in said steam-chests and controlling the entrance of steam to the cylinder, cut-off valves for controlling the entrance of steam to the said slide-valves, means of connection between the slide-valves and also between the cut-off valves, hollow stems connected to the said slide-valves, rods extending through said stems and connected to the cut-off valves, rock-shafts for actuating, respectively, the hollow stems and rods, and means of connection between the said rock-shafts and the eccentric-rod of the engine.

9. In a steam-engine, the combination of a cylinder, a piston and piston-rod operating therein, a steam-chest at one end of the cylinder and communicating therewith, a slide-valve operating in said steam-chest and consisting of a shell divided by a double wing and connected to a hub concentric with the piston-rod, a sleeve fitting within the said valve-hub and flared at one end, a coned nut on the opposite end of said sleeve, and mechanism for operating the valve.

10. In a steam-engine, the combination of a cylinder, a piston and piston-rod operating therein, a steam-chest at one end of the cylinder and communicating therewith, a slide-valve operating in said steam-chest and consisting of a shell divided by a double wing and connected to a hub concentric with the piston-rod, a projection forming a surface extending the length of the valve and closing the opening between the members of said double wing, a sleeve fitting within the said valve-hub and flared at one end, a coned nut on the opposite end of said sleeve, and mechanism for operating the valve.

In testimony whereof I affix my signature in the presence of two witnesses.

EDWARD P. COWLES.

Witnesses:
W. T. MULLIGAN,
A. O. CHAPMAN.